(12) United States Patent
Yamashita

(10) Patent No.: US 11,296,925 B2
(45) Date of Patent: Apr. 5, 2022

(54) NETWORK ANALYZER THAT PROVIDES ANSWER TO INQUIRY ABOUT NETWORK FAILURE AND NETWORK ANALYZING METHOD

(71) Applicant: FUJITSU LIMITED, Kawasaki (JP)

(72) Inventor: Shinji Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/837,446

(22) Filed: Apr. 1, 2020

(65) Prior Publication Data

US 2020/0366547 A1 Nov. 19, 2020

(30) Foreign Application Priority Data

May 13, 2019 (JP) .............................. JP2019-090518

(51) Int. Cl.
*H04L 12/24* (2006.01)
*G06N 3/08* (2006.01)
*H04L 41/069* (2022.01)
*H04L 41/14* (2022.01)
*H04L 12/26* (2006.01)

(52) U.S. Cl.
CPC ............. *H04L 41/069* (2013.01); *G06N 3/08* (2013.01); *H04L 41/14* (2013.01)

(58) Field of Classification Search
CPC ... H04L 41/069; H04L 41/14; H04L 41/0631; H04L 41/145; H04L 43/10; G06N 3/08
See application file for complete search history.

(56) References Cited

U.S. PATENT DOCUMENTS

| | | | | |
|---|---|---|---|---|
| 2002/0114523 A1* | 8/2002 | Filatov | ............... | G06K 9/00852 382/229 |
| 2009/0222330 A1* | 9/2009 | Leinbach | ............... | G06Q 30/02 705/319 |

(Continued)

FOREIGN PATENT DOCUMENTS

| | | |
|---|---|---|
| JP | H11-003335 A | 1/1999 |
| JP | 2002-230004 A | 8/2002 |

(Continued)

*Primary Examiner* — Ario Etienne
*Assistant Examiner* — Kamal Hossain
(74) *Attorney, Agent, or Firm* — Fujitsu Patent Center

(57) ABSTRACT

A network analyzer includes a storage and a processor to provide an answer to inquiry including an inquiry statement and device log. The storage stores first information indicating relation between a previously received inquiry statement and an answer for the inquiry statement and second information indicating relation between previously received device log and an answer for the device log. The processor selects a first answer candidate for a new inquiry statement and calculates a first degree of certainty of the first answer candidate based on the first information. The processor selects a second answer candidate for new device log corresponding to the new inquiry statement and calculates a second degree of certainty of the second answer candidate based on the second information. The processor determines an answer based on the first answer candidate, the first degree of certainty, the second answer candidate, and the second degree of certainty.

8 Claims, 15 Drawing Sheets

(56) References Cited

U.S. PATENT DOCUMENTS

| | | | | |
|---|---|---|---|---|
| 2016/0042275 A1* | 2/2016 | Dettman | ................ | G06N 5/003 706/46 |
| 2016/0065620 A1* | 3/2016 | Liu | .................... | H04L 63/1408 726/1 |
| 2016/0100000 A1* | 4/2016 | Dey | .................... | G06Q 20/102 709/205 |
| 2017/0372323 A1* | 12/2017 | Stern | .................. | G06F 16/3344 |
| 2018/0004752 A1* | 1/2018 | Deng | ....................... | G06F 16/93 |
| 2018/0341871 A1* | 11/2018 | Maitra | ................ | G06N 3/0427 |
| 2019/0108470 A1* | 4/2019 | Jain | ........................ | G06Q 10/20 |
| 2021/0034817 A1* | 2/2021 | Asao | ........................ | G06N 3/08 |

FOREIGN PATENT DOCUMENTS

| | | |
|---|---|---|
| JP | 2005-181928 A | 7/2005 |
| JP | 2011-065380 A | 3/2011 |
| JP | 2018-136656 A | 8/2018 |

\* cited by examiner

| INCIDENT NUMBER | W1 | W2 | ... | Wn | ANSWER PATTERN |
|---|---|---|---|---|---|
| I-001 | 3 | 0 |  | 1 | PATTERN P1 |
| I-002 | 0 | 2 |  | 0 | PATTERN P3 |
| I-003 | 5 | 0 |  | 1 | PATTERN P2 |
| ... |  |  |  |  |  |
| I-xxx | 1 | 4 |  | 3 | PATTERN P1 |

| NEW INCIDENT | 2 | 1 |  | 0 |  |

WORD VECTOR OF NEW INQUIRY STATEMENT

| ANSWER PATTERN | DEGREE OF CERTAINTY C1 |
|---|---|
| P3: POWER FAILURE | 50% |
| P2: BFD SESSION DOWN | 30% |
| P1: MEMORY FAILURE | 20% |

NEW INQUIRY STATEMENT

The BFD session was down in device xx installed in site A of our company.
Please check the following contents and respond to it.
<Event>
2019/01/29 12:12:05 BFD session is down.
Recovered to the normal state afterward.

UNNECESSARY WORD: OUR COMPANY, CONTENTS, CHECK, RESPOND, ...
WORD TO BE EXTRACTED: SITE A, DEVICE xx, BFD SESSION DOWN, ...

MORPHOLOGICAL ANALYSIS
DICTIONARY

GENERATE WORD VECTOR

| INCIDENT NUMBER | SITE A | DEVICE xx | BFD SESSION DOWN | NORMAL | RECOVER(ED) |
|---|---|---|---|---|---|
| I-00n | 1 | 1 | 2 | 1 | 1 |

F I G. 4

FIG. 6A
| INCIDENT NUMBER | L 1 | L 2 | ... | L m | ANSWER PATTERN |
|---|---|---|---|---|---|
| I-001 | 2 | 3 | | 0 | PATTERN P1 |
| I-002 | 1 | 5 | | 3 | PATTERN P3 |
| I-003 | 0 | 2 | | 2 | PATTERN P2 |
| ... | | | | | |
| I-xxx | 3 | 1 | | 5 | PATTERN P1 |
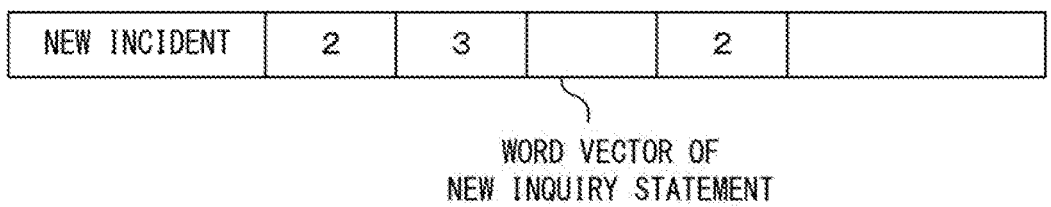
| NEW INCIDENT | 2 | 3 | | 2 | |
WORD VECTOR OF
NEW INQUIRY STATEMENT
FIG. 6B
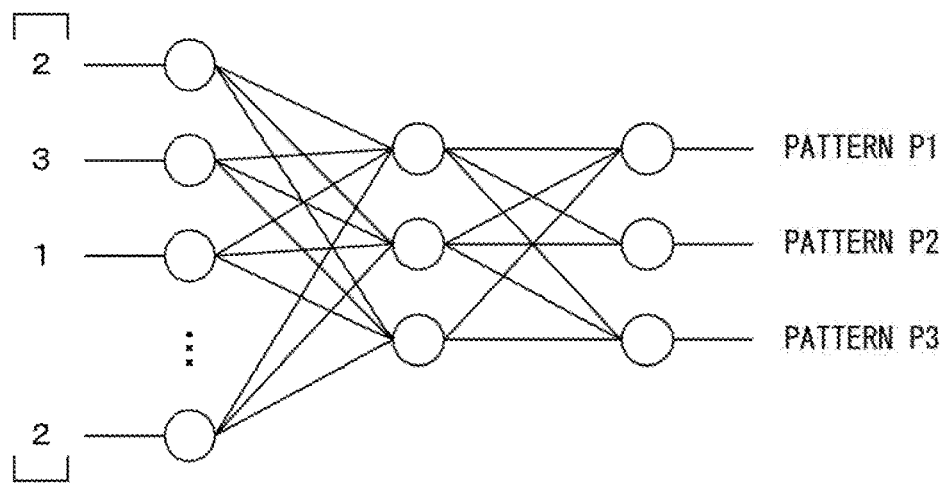
FIG. 6C
| ANSWER PATTERN | DEGREE OF CERTAINTY C2 |
|---|---|
| P2: BFD SESSION DOWN | 7 0 % |
| P3: POWER FAILURE | 2 0 % |
| P1: MEMORY FAILURE | 1 0 % |

ANSWER CANDIDATE CORRESPONDING TO INQUIRY STATEMENT

| PATTERN | DEGREE OF CERTAINTY C1 |
|---|---|
| P5 | 35% |
| P4 | 25% |
| P3 | 20% |
| P1 | 15% |
| P2 | 5% |

ANSWER CANDIDATE CORRESPONDING TO DEVICE LOG

| PATTERN | DEGREE OF CERTAINTY C2 |
|---|---|
| P5 | 40% |
| P4 | 25% |
| P3 | 20% |
| P2 | 10% |
| P1 | 5% |

⇩

| PATTERN | RANK(C1) | RANK(C2) |
|---|---|---|
| P1 | 4 (=X1) | 5 (=Y1) |
| P2 | 5 (=X2) | 4 (=Y2) |
| P3 | 3 (=X3) | 3 (=Y3) |
| P4 | 2 (=X4) | 2 (=Y4) |
| P5 | 1 (=X5) | 1 (=Y5) |

⇩

CORRELATION VALUE $R_{xy} = 0.9$

⇩

$C3i = (C1i + C2i) / 2$

⇩

| PATTERN | DEGREE OF CERTAINTY C3 |
|---|---|
| P5 | 37.5% |
| P4 | 25% |
| P3 | 20% |
| P1 | 10% |
| P2 | 7.5% |

FIG. 13

ANSWER CANDIDATE CORRESPONDING TO INQUIRY STATEMENT

| PATTERN | DEGREE OF CERTAINTY C1 |
|---------|------------------------|
| P 2 | 3 5 % |
| P 1 | 2 5 % |
| P 4 | 2 0 % |
| P 3 | 1 5 % |
| P 5 | 5 % |

ANSWER CANDIDATE CORRESPONDING TO DEVICE LOG

| PATTERN | DEGREE OF CERTAINTY C2 |
|---------|------------------------|
| P 5 | 4 0 % |
| P 4 | 2 5 % |
| P 3 | 2 0 % |
| P 2 | 1 0 % |
| P 1 | 5 % |

| PATTERN | RANK (C1) | RANK (C2) |
|---------|-----------|-----------|
| P 1 | 2 (=X1) | 5 (=Y1) |
| P 2 | 1 (=X2) | 4 (=Y2) |
| P 3 | 4 (=X3) | 3 (=Y3) |
| P 4 | 3 (=X4) | 2 (=Y4) |
| P 5 | 5 (=X5) | 1 (=Y5) |

CORRELATION VALUE $R_{xy} = -0.8$ $C3i = (C1i + 4 \times C2i) / 5$

| PATTERN | DEGREE OF CERTAINTY C3 |
|---------|------------------------|
| P 5 | 3 3 % |
| P 4 | 2 4 % |
| P 3 | 1 9 % |
| P 2 | 1 5 % |
| P 1 | 9 % |

F I G. 1 4

NETWORK ANALYZER THAT PROVIDES ANSWER TO INQUIRY ABOUT NETWORK FAILURE AND NETWORK ANALYZING METHOD

CROSS-REFERENCE TO RELATED APPLICATION

This application is based upon and claims the benefit of priority of the prior Japanese Patent Application No. 2019-090518, filed on May 13, 2019, the entire contents of which are incorporated herein by reference.

FIELD

The embodiments discussed herein are related to a device and a method for analyzing a network.

BACKGROUND

When a failure occurred in a network, a user (e.g., a communication service provider) makes an inquiry to a maintenance operator of network devices (e.g., a network device vendor). At that time, the user sends an email, for example, to the maintenance operator as illustrated in FIG. 1. This email includes an inquiry statement, and the inquiry statement describes the situation of the failure. In addition, when needed, a device log may be attached to this email.

The maintenance operator deduces a cause of failure based on the inquiry statement received from the user. At that time, the maintenance operator has Q&A descriptions in which previously received inquiry statements and the corresponding answers are collected and device logs previously received from users. The maintenance operator deduces a cause of failure by referencing to the Q&A descriptions and the device logs and generates proposed countermeasures. The maintenance operator finally sends an answer including the deduced cause and the countermeasures to the user.

In recent years, methods of generating answer statements by using computers have been turned to practical use. In this case, a computer makes a search in previous Q&A descriptions by using an inquiry statement received from a user and thereby proposes a cause of failure and countermeasures.

Note that a method of proposing a response with high accuracy for failures detected by a monitoring system has been proposed (e.g., Japanese Laid-open Patent Publication No. 2018-136656). In addition, a method to make an easy and effective use of question contents included in existing documents and answer contents in response to the question contents has also been proposed (e.g., Japanese Laid-open Patent Publication No. H11-003335). Furthermore, related arts are disclosed in Japanese Laid-open Patent Publication No. 2002-230004, Japanese Laid-open Patent Publication No. 2011-065380, and Japanese Laid-open Patent Publication No. 2005-181928.

As described above, in response to an inquiry statement received from a user, a maintenance operator (or a computer of the maintenance operator) deduces a cause of failure and generates countermeasures. However, the user may not be able to describe the situation of the failure accurately. When the situation of the failure is not accurately written in the inquiry statement, the deduced cause of failure may not be accurate and improper countermeasures may be proposed.

Such a problem can be solved or alleviated by checking the consistency between the deduced cause of failure and a device log, for example. However, this consistency checking will increase the workload of the maintenance operator.

SUMMARY

According to an aspect of the embodiments, a network analyzer provides an answer to an inquiry including an inquiry statement about a network failure and a device log corresponding to the inquiry statement. The network analyzer includes a storage and a processor. The storage stores first information that indicates a relation between a previously received inquiry statement and an answer that has been provided in response to an inquiry including the inquiry statement and second information that indicates a relation between a previously received device log and an answer that has been provided in response to an inquiry including the device log. The processor selects a first answer candidate from a plurality of answer patterns in response to a new inquiry statement and calculates a first degree of certainty that indicates a certainty of the first answer candidate based on the first information. The processor selects a second answer candidate from the plurality of answer patterns in response to a new device log corresponding to the new inquiry statement and calculates a second degree of certainty that indicates a certainty of the second answer candidate based on the second information. The processor determines an answer to the new inquiry statement based on the first answer candidate, the first degree of certainty, the second answer candidate, and the second degree of certainty.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 illustrates an example of a method of generating a word vector for an inquiry statement;

FIG. 6A to FIG. 6C illustrate an example of a method of selecting answer candidates corresponding to a device log;

FIG. 13 and FIG. 14 illustrate an example of a method of calculating a degree of certainty in accordance with a correlation value.

DESCRIPTION OF EMBODIMENTS

Figure 1:
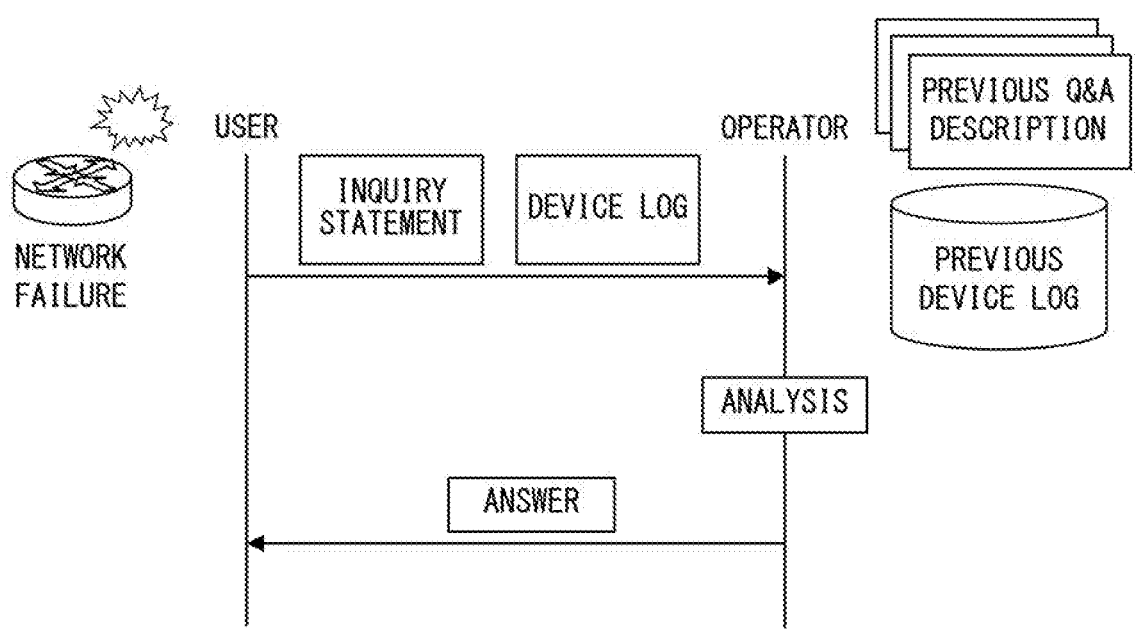
FIG. 1 illustrates an example of a method of generating an answer to an inquiry from a user.
Figure 2:
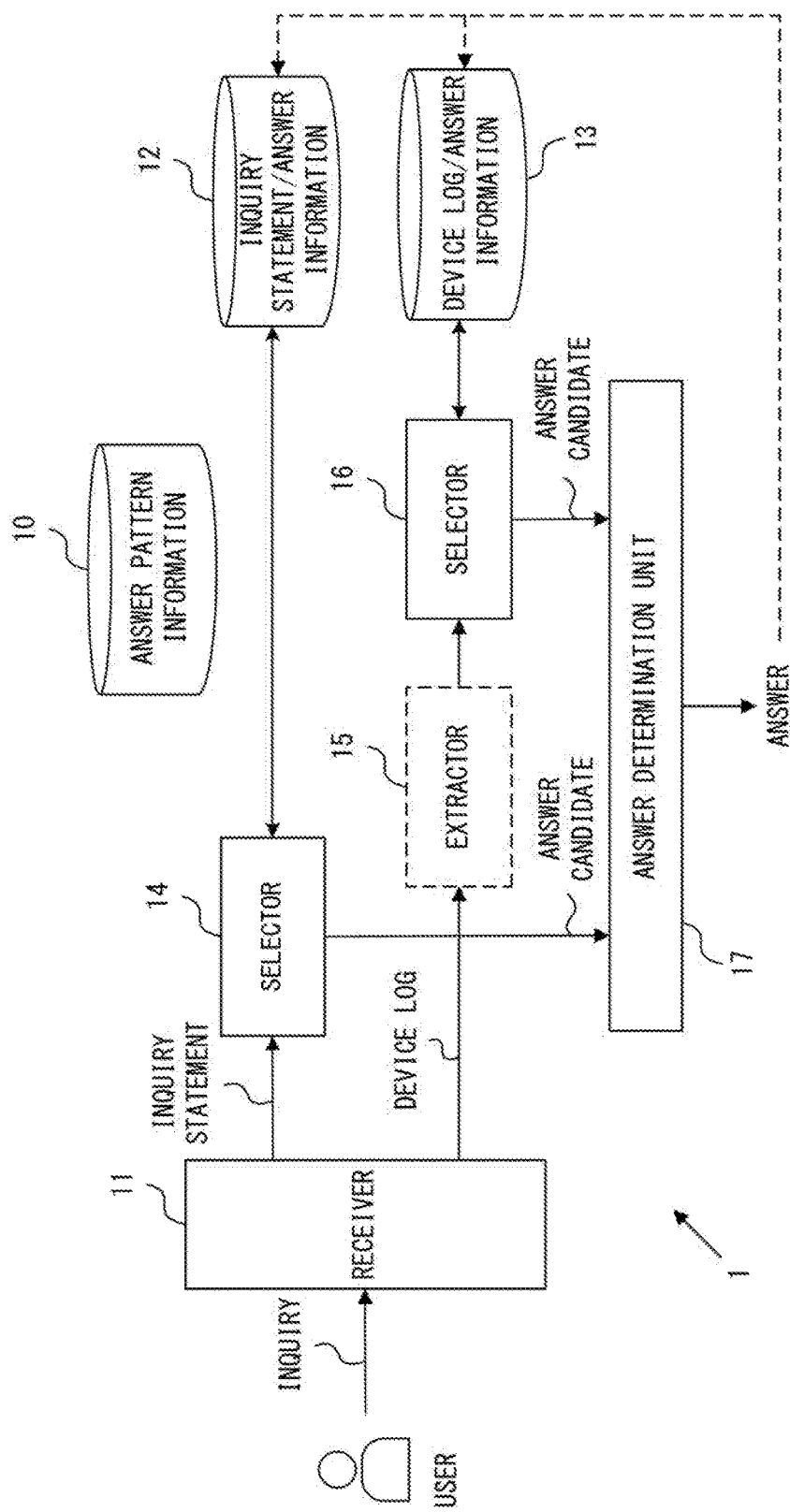
FIG. 2 illustrates an example of a network analyzer.

FIG. 2 illustrates an example of a network analyzer according to the embodiments of the invention. A network analyzer 1 receives an inquiry about a failure in a network from a user. This user may be, for example, a communication service provider that provides communication services over networks. The inquiry in this example includes an inquiry statement about the failure in the network and a device log that corresponds to the inquiry statement. The network analyzer 1 provides an answer to the inquiry. The answer may be edited by a maintenance operator as needed and is provided to the user afterward.

The network analyzer 1 includes a storage 10, a receiver 11, a storage 12, a storage 13, a selector 14, an extractor 15, a selector 16, and an answer determination unit 17. Note that the network analyzer 1 may include any components other than those illustrated in FIG. 2.

The storage 10 stores answer pattern information. The answer pattern information provides samples of answers with respect to inquiries about network failure. Note that causes of network failure are deducible in advance. Once a cause of network failure is identified, recovery measures of the failure are mostly determined. Therefore, for each of deduced causes, maintenance operators can generate in advance answer patterns in response to network failures.

The receiver 11 receives inquiries sent from users. An inquiry, as described above, includes an inquiry statement about a failure in a network and a device log corresponding to the inquiry statement. The inquiry statement is, for example, sent via an e-mail. In this case, the inquiry statement is written by a user. The device log is information that chronologically records operating conditions of network devices. The device log may be attached to the e-mail, for example.

The storage 12 stores pieces of information that represents a relation between an inquiry statement that has been received previously by the receiver 11 and an answer to an inquiry including the inquiry statement (this information may be hereinafter referred to as "inquiry statement/answer information"). The storage 12 also stores a classification model generated in accordance with the inquiry statement/answer information.

The storage 13 stores pieces of information that represents a relation between a device log that has been received previously by the receiver 11 and an answer to an inquiry including the device log (this information may be hereinafter referred to as "device log/answer information"). The storage 13 also stores a classification model generated in accordance with the device log/answer information.

The selector 14 selects one or plural answer patterns from among predetermined answer patterns as answer candidate(s) corresponding to a new inquiry statement received by the receiver 11. At that time, the selector 14 uses the inquiry statement/answer information and the classification model that are stored in the storage 12. In addition, the selector 14 calculates a degree of certainty that indicates accuracy of the selected answer pattern(s) (i.e., the answer candidate(s) corresponding to the inquiry statement). Note that the predetermined answer patterns are registered in the storage 10 as answer pattern information.

The extractor 15 extracts log information within a specific time range from the new device log received by the receiver 11 based on information on a point in time written in the inquiry statement corresponding to the device log. For example, when a point in time at which a network failure occurred is written in an inquiry statement, log information within a time range that is near the point in time is extracted. The network analyzer 1, however, does not necessarily have the extractor 15.

The selector 16 selects one or plural answer patterns from among the above-described answer patterns as answer candidate(s) corresponding to a new device log received by the receiver 11 (or log information output from the extractor 15). At that time, the selector 16 uses the device log/answer information and the classification model stored in the storage 13. The selector 16 also calculates a degree of certainty that indicates accuracy of the selected answer pattern(s) (i.e., the answer candidate(s) corresponding to the device log).

The answer determination unit 1 determines an answer to the new inquiry statement received by the receiver 11 based on the answer pattern(s) selected by the selector 14 and corresponding degree of certainty of the answer pattern(s), and the answer pattern(s) selected by the selector 16 and corresponding degree of certainty of the answer pattern(s). The answer may be edited by a maintenance operator as needed and is provided to the user. Inquiry statement/answer information that represents a relation between the new inquiry statement and the answer is accumulated in the storage 12. Similarly, device log/answer information that represents a relation between the new device log and the answer is accumulated in the storage 13. In addition, when these pieces of information are added to the storages 12 and 13, the classification models in the storages are respectively updated.

Figures 3A, 3B, 3C:
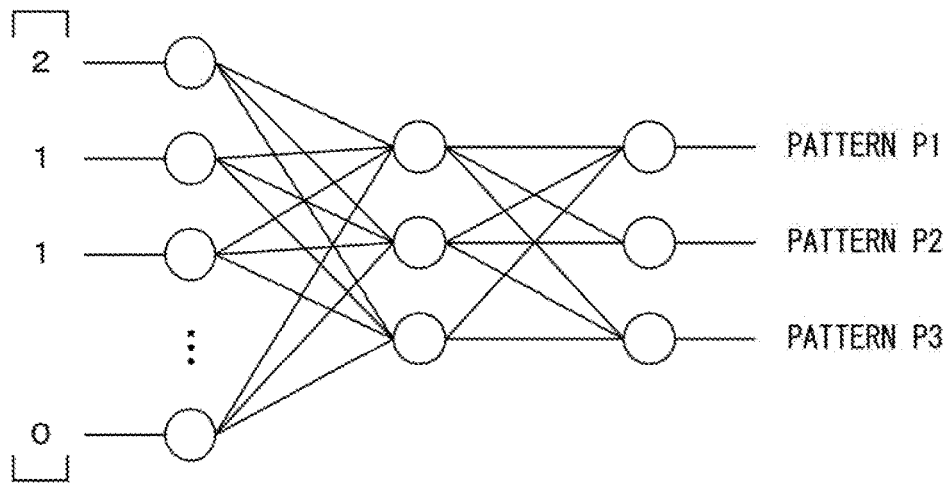
FIG. 3A to FIG. 3C illustrate an example of a method of selecting answer candidates corresponding to an inquiry statement.

FIG. 3A to FIG. 3C illustrate an example of a method of selecting answer candidates corresponding to an inquiry statement. In this example, the inquiry statement/answer information illustrated in FIG. 3A is stored in the storage 12.

The inquiry statement/answer information includes incident numbers, the numbers of appearance for each word, and answer patterns. The incident numbers identify inquiries that were previously received from users. In this example, one incident number is given to one inquiry. Each of the numbers of appearance indicates a number of times that a target word, which is extracted in accordance with specific rules, is appeared in an inquiry statement. For example, in an inquiry statement in the inquiry identified by incident number I-001, word W1 appears three times, word W2 does not appear, and word Wn appears once. The answer patterns represent answers that have been provided to users in response to inquiries. In this example, "answer pattern P1" is provided in response to the inquiry identified by incident number I-001.

For an inquiry statement included in a new inquiry, the selector 14 generates a word vector. At that time, as pre-processing, the selector 14 performs morphological analysis of the new inquiry statement. The selector 14 has a dictionary that defines unnecessary words and words to be extracted. By using this dictionary, the selector 14 decomposes the new inquiry statement to parts of speech and extracts words. In addition, the selector 14 generates a word vector by counting the numbers of appearance for each of the words extracted from the new inquiry statement. In the example illustrated in FIG. 3A, word W1 appears twice, word W2 appears once, and word Wn does not appear in a new inquiry statement.

Then the selector 14 gives the word vector generated from the new inquiry statement to a classification model. Here, the classification model is assumed to be generated in accordance with the inquiry statement/answer information illustrated in FIG. 3A. As an example, the classification model is implemented by a neural network illustrated in FIG. 3B. In this case, the neural network includes a plurality of layers, and each layer includes plural nodes. In each of the nodes, an input value is multiplied by a weight.

When a word vector is given to the classification model, one or plural answer patterns that match(es) the word vector is/are output as answer candidate(s). At that time, the selection of one or plural answer patterns is made, for example, based on a distance between an input word vector and each of the word vectors in the inquiry statement/answer information. Note that, the weights of the neural network are updated through machine learning every time an answer to an inquiry from a user is determined, for example, in accordance with a combination of the inquiry statement and the answer.

In this example, three answer patterns are selected in response to a new inquiry statement (i.e., an input word vector). Note that in FIG. 3C, each answer pattern corresponds to a cause of network failure (power failure, BFD (Bi-directional Forwarding Detection) session down, memory failure).

A degree of certainty indicates accuracy of each answer pattern selected in response to a new inquiry statement (i.e., an input word vector). In this example, a degree of certainty is determined in a manner that the sum of the degrees of certainty of the answer patterns becomes 100 percent.

Note that in the example illustrated in FIG. 3A to FIG. 3C, the classification model is implemented by using a neural network, but the present embodiments are not limited to this configuration. In other words, the classification model can be configured by any methods. For example, the classification model can be implemented by SVM (Support Vector Machine).

FIG. 4 illustrates an example of a method of generating a word vector for an inquiry statement. In this example, "our company", "contents", "check", "respond", etc., are registered as unnecessary words in the dictionary to which the selector 14 references. Additionally, "site A", "device xx", "BFD session down", etc., are registered as words to be extracted. The selector 14 generates a word vector corresponding to the inquiry statement by counting the number of times that each of the words to be extracted appears in the inquiry statement.

Figure 5:
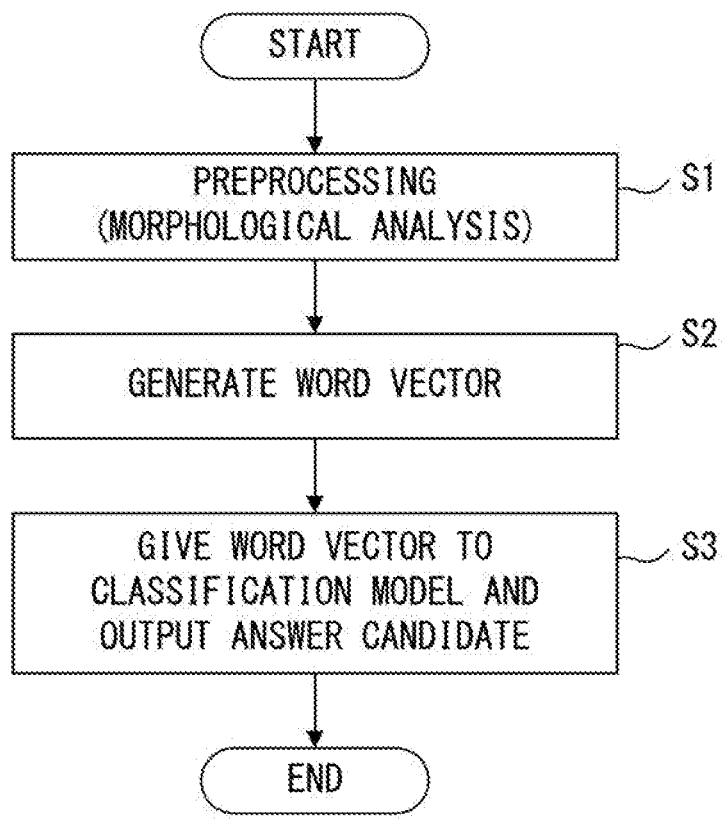
FIG. 5 is a flowchart of an example of a method of selecting answer candidates corresponding to an inquiry statement.

FIG. 5 is a flowchart of an example of a method of selecting answer candidates corresponding to an inquiry statement. The process in this flowchart is executed by the selector 14 when a new inquiry statement is input.

In S1, the selector 14 performs morphological analysis of the new inquiry statement. At that time, the selector 14 decomposes the inquiry statement to parts of speech and extracts words. At the time of extracting words, the selector 14 references to a dictionary in which unnecessary words and words to be extracted are registered.

In S2, the selector 14 generates a word vector corresponding to the new inquiry statement. At that time, the word vector of the inquiry statement is generated by counting the number of times that each of the words to be extracted appears in the inquiry statement.

In S3, the selector 14 gives the generated word vector to a classification model and thereby selects one or plural answer patterns corresponding to the inquiry statement as answer candidate(s). A degree of certainty is assigned to each answer pattern. In other words, an answer candidate or answer candidates each having a degree of certainty is/are output for the new inquiry statement.

In this manner, the network analyzer 1 outputs answer candidate(s) that include(s) one or plural answer patterns for a new inquiry statement. However, users may not be able to describe the situations of failure accurately. In other words, inquiry statements may not accurately describe the situations of failure. When an inquiry statement does not accurately represent a situation of failure, the deduction of the cause of failure will not be correct and improper answer candidates may be output.

In order to solve or alleviate this problem, the network analyzer 1 outputs answer candidate(s) corresponding to an inquiry statement as well as outputting answer candidate(s) corresponding to a device log. Based on both the answer candidate(s) corresponding to the inquiry statement and the answer candidate(s) corresponding to the device log, the network analyzer 1 generates an answer to the inquiry.

FIG. 6A to FIG. 6C illustrate an example of a method of selecting answer candidate(s) corresponding to a device log. In this example, the storage 13 is assumed to store device log/answer information illustrated in FIG. 6A.

The device log/answer information includes incident numbers, the numbers of appearance for each word, and answer patterns. The incident numbers identify inquiries that were previously received from users, as explained with reference to FIG. 3A. Note that in this example, one device log is attached to one inquiry statement in each inquiry. Each of the numbers of appearance indicates the number of times that a target word, which is extracted in accordance with specific rules, is appeared in a device log. For example, in a device log in the inquiry identified by incident number I-001, word L1 appears twice, word L2 appears three times, but word Lm does not appear. The answer patterns represent answers that have been provided to users in response to inquiries, as explained with reference to FIG. 3A.

The selector 16 generates a word vector based on a device log included in a new inquiry. However, a device log, in general, records a large volume of information. When a word vector is generated based on the entirety of a device log, the load of the network analyzer 1 will increase. In addition, information that is not related to the failure may be analyzed. In consideration of this, the network analyzer 1 may have an extractor 15.

The extractor 15 obtains, from an inquiry statement corresponding to a new device log, information that is related to a point in time at which a network failure occurred. The extractor 15 then determines a time range corresponding to the point in time at which the network failure occurred in accordance with the information obtained from the inquiry statement. The extractor 15 extracts log information within the determined time range from the device log. For example, in the case in FIG. 4, the extractor 15 obtains "2019/01/29 12:12:05 BFD session is down" from the corresponding inquiry statement. The extractor 15 then determines "±1 hour with respect to 2019/01/29 12:12:05" to be the time range to extract the log information. In this case, the extractor 15 extracts the log information within this time range from the input device log. The extracted log information is given to the selector 16.

Accordingly, the selector 16 generates a word vector based on the log information extracted by the extractor 15.

Here, the method of generating a word vector based on a device log (or log information) is substantially the same as the method of generating a word vector based on an inquiry statement. In this example, a word vector illustrated in FIG. 6A is generated.

Then the selector 16 gives the word vector generated from the new device log to a classification model. The classification model is assumed to be generated in advance according to the device log/answer information illustrated in FIG. 6A. The classification model is implemented, for example, by a neural network illustrated in FIG. 6B. However, the classification model may be implemented by any methods other than the neural network. When a word vector is given to the classification model, one or plural answer patterns that match(es) the word vector is/are output. In this example, answer patterns illustrated in FIG. 6C are selected for the new device log (i.e., the input word vector). In addition, a degree of certainty is assigned to each of the selected answer patterns.

Figure 7:
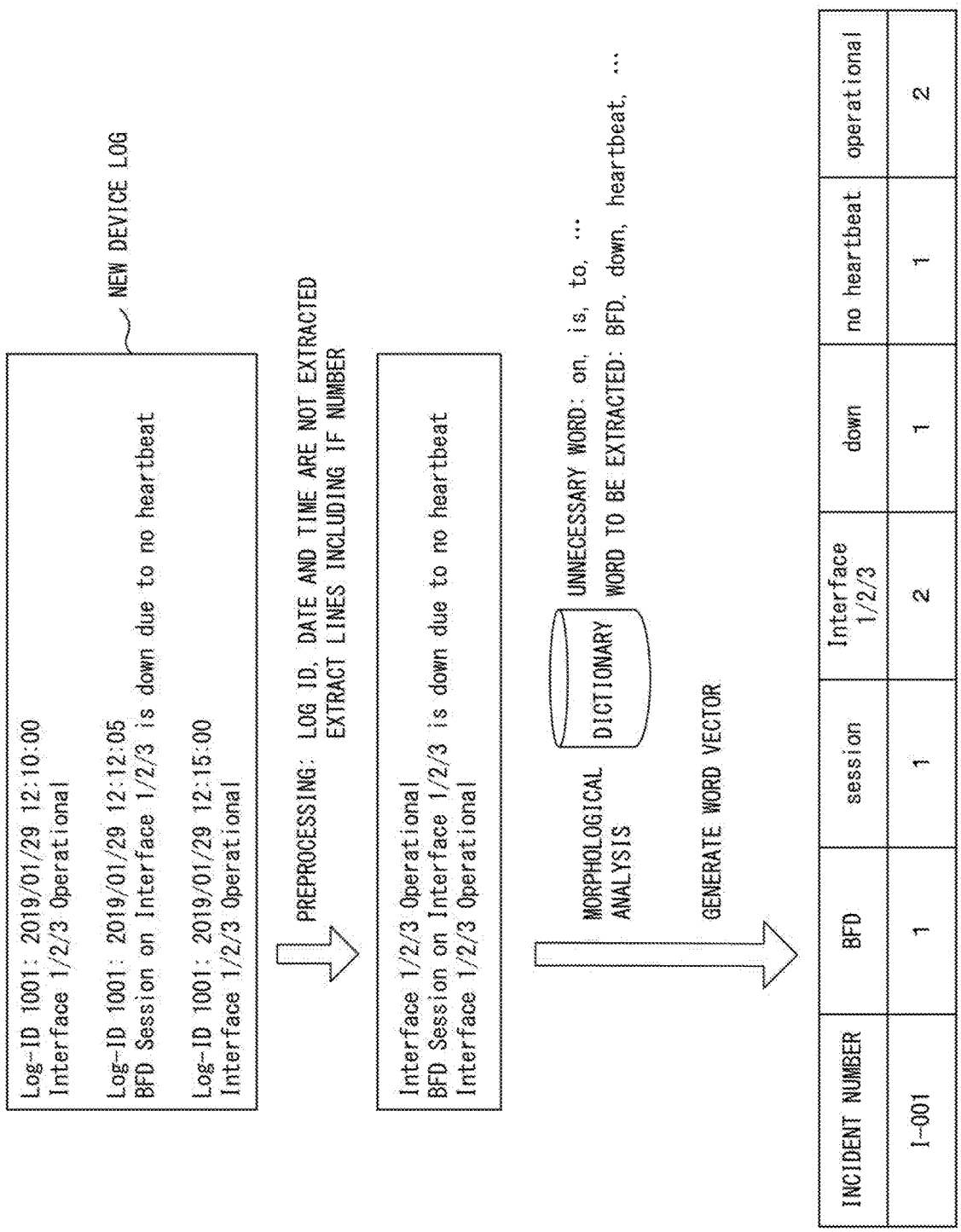
FIG. 7 illustrates an example of a method of generating a word vector of a device log.

FIG. 7 illustrates an example of a method of generating a word vector of a device log. In this example, log information extracted by the extractor 15 is input to the selector 16. Here, the extractor 15 extracts a portion of information of the device log based on the inquiry statement in FIG. 4. In the example of FIG. 4, the inquiry statement describes that the failure occurred at 2019/01/29 12:12:05. The extractor 15 extracts log information that is related to any events within is minutes with respect to the point in time at which the failure occurred.

"On", "is", "to", etc., are registered as unnecessary words in the dictionary to which the selector 16 references. As words to be extracted, "BFD", "down", "heartbeat", etc., are registered. The selector 16 generates a word vector of the device log by counting the number of times that each of the words to be extracted appears in the device log.

Figure 8:
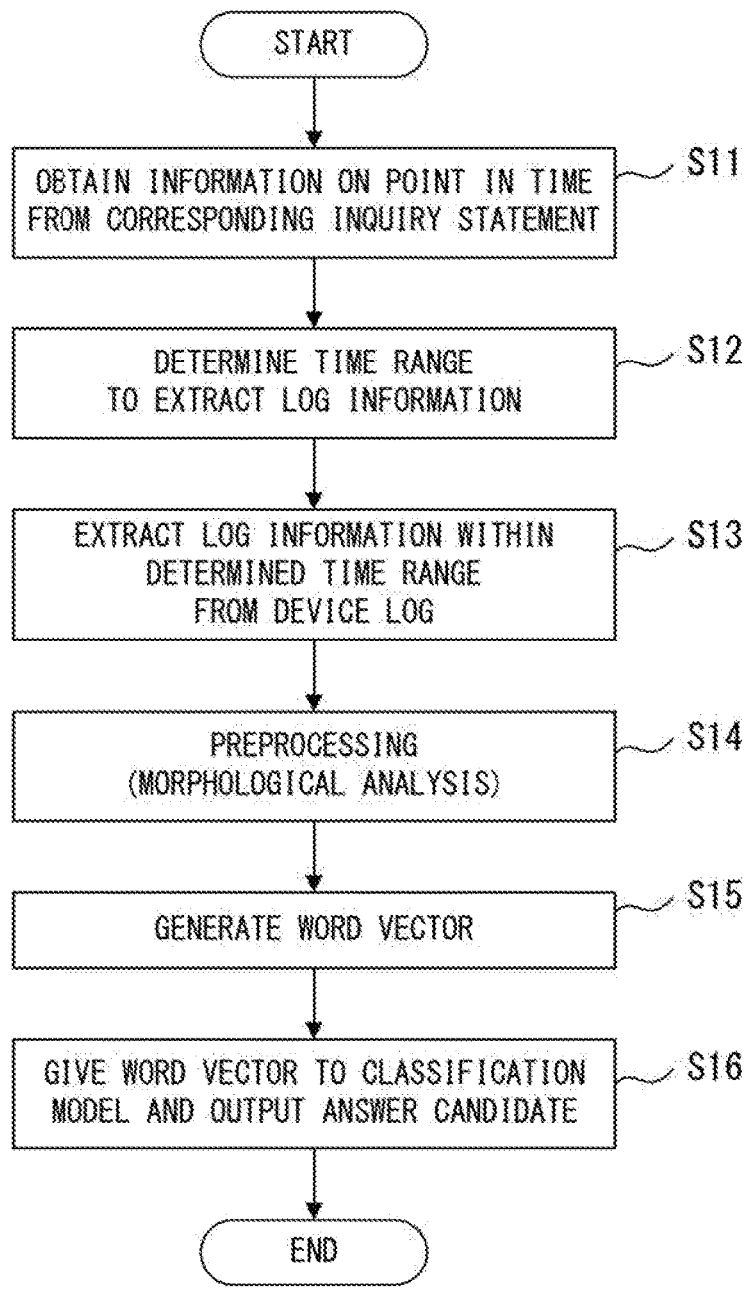
FIG. 8 is a flowchart of an example of a method of determining answer candidates corresponding to the device log.

FIG. 8 is a flowchart of an example of a method of selecting answer candidates corresponding to the device log. The processing in this flowchart is executed by the extractor 15 and the selector 16 when a new device log is input.

In S11, the extractor 15 obtains information that is related to a point in time in the corresponding inquiry statement. In S12, the extractor 15 determines a time range to extract log information in accordance with the information obtained in S11. In S13, the extractor 15 extracts the log information within the time range determined in S12 from the device log.

The process in S14 to S16 is substantially the same as the process in S1 to S3 in FIG. 5. In other words, in S14, the selector 16 performs morphological analysis of the device log (or the log information). In S15, the selector 16 generates a word vector of the device log. In S16, the selector 16 gives the generated word vector to a classification model and thereby outputs one or plural answer patterns corresponding to the device log. A degree of certainty is assigned to each answer pattern. In other words, an answer candidate or answer candidates each having a degree of certainty is/are output for the new device log.

As described above, when receiving an inquiry that includes an inquiry statement and a device log, the network analyzer 1 selects one or plural answer patterns corresponding to the inquiry statement and one or plural answer patterns corresponding to the device log. Here, a degree of certainty C1 is assigned to each answer pattern corresponding to the inquiry statement and a degree of certainty C2 is assigned to each answer pattern corresponding to the device log. The network analyzer 1 calculates a degree of certainty C3 for each answer pattern based on the degree of certainty C1 and the degree of certainty C2.

Figure 9:
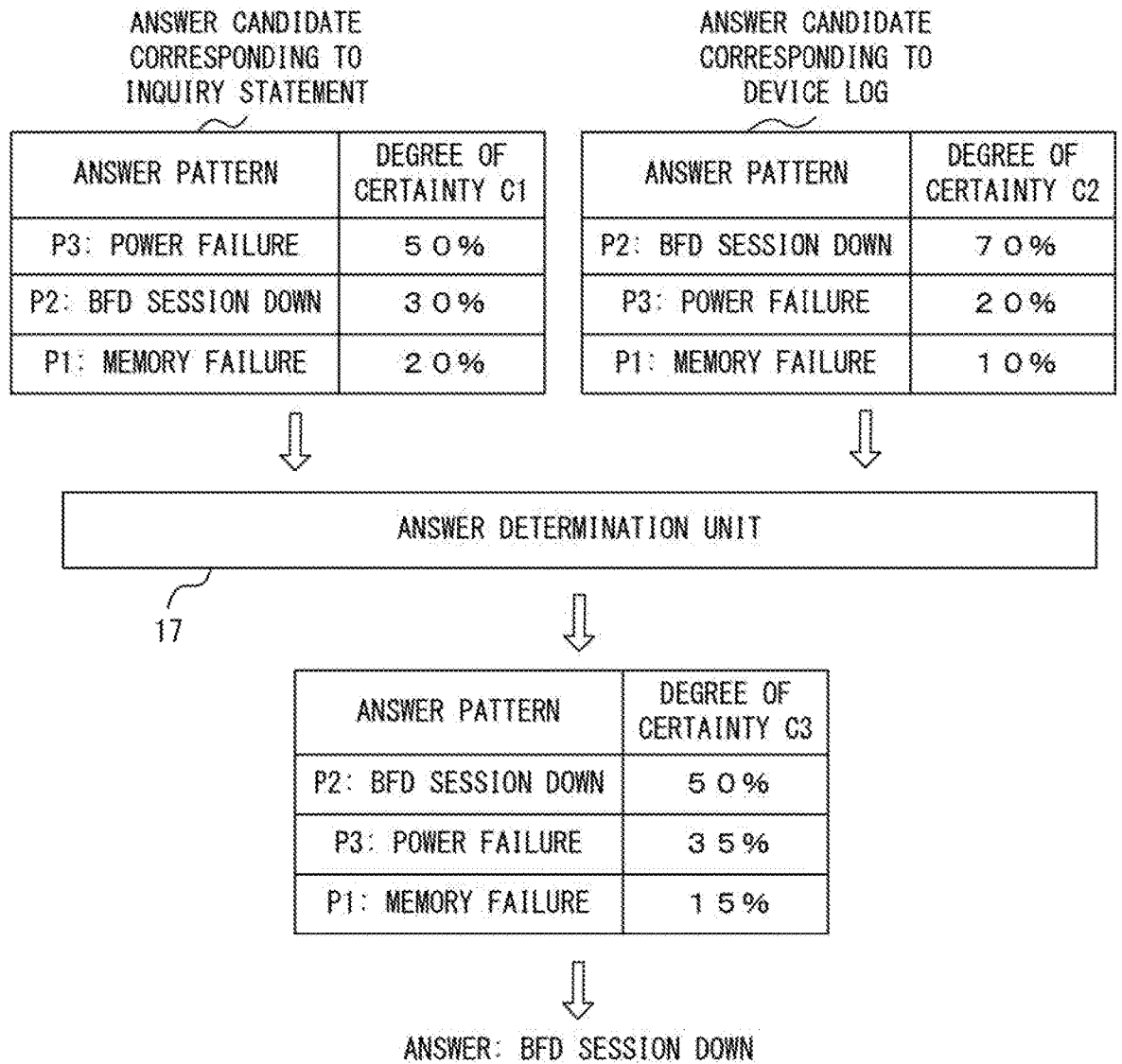
FIG. 9 illustrates an example of a method of calculating a degree of certainty for each answer candidate based on both an inquiry statement and a device log.

FIG. 9 illustrates an example of a method of calculating a degree of certainty for each of answer candidates based on both an inquiry statement and a device log. In this example, answer patterns P1, P2, and P3 are obtained as answer patterns based on an inquiry statement. The degrees of certainty C1 for the answer patterns P1, P2, and P3 are "20%, 30%, 50%", respectively. Answer patterns P1, P2, and P3 are also obtained as answer patterns based on a device log. Here, the degrees of certainty C2 for the answer patterns P1, P2, and P3 obtained from the device log are "10%, 70%, 20%", respectively.

The answer determination unit 17 calculates a degree of certainty C3 for each of answer patterns based on a degree of certainty C1 and a degree of certainty C2. In this example, the answer determination unit 17 obtains a degree of certainty C3 by averaging a degree of certainty C1 and a degree of certainty C2 for each of answer patterns. More specifically, "15%, 50%, 35%" are obtained as the degrees of certainty C3 for the answer patterns P1, P2, and P3, respectively.

Note that in the example illustrated in FIG. 9, the answer patterns selected in response to an inquiry statement coincide with the answer patterns selected in response to a device log. However, the present embodiments are not limited to this case. An example of other cases is that answer patterns selected in response to an inquiry sentence and the corresponding degrees of certainty C1 are "P1: 20%, P2: 30%, P3: 50%" and answer patterns selected in response to a device log and the corresponding degrees of certainty C2 are "P2: 80%, P3: 20%". In this case, the degrees of certainty C3 are calculated under the assumption that the degree of certainty C2 for the answer pattern P1 obtained for the device log is "0%". Then the degrees of certainty C3 of the answer patterns are "10%, 55%, 35%".

The answer determination unit 17 determines an answer to the inquiry from a user based on the degrees of certainty C3 of the answer patterns. More specifically, an answer pattern with the highest degree of certainty C3 is selected as an answer to be provided to the user. In this example, the degree of certainty C3 for the answer pattern P2 is the highest. Accordingly, the answer determination unit 17 deduces that the cause of network failure is "BFD session down" and outputs an answer statement that describes countermeasures against BFD session down. This answer statement is sent from a maintenance operator who uses the network analyzer 1 to the user. At that time, the maintenance operator may edit or make corrections to the answer statement output by the network analyzer 1 as needed. Or, the answer statement may be sent to the user from the network analyzer 1 (without any intervention of the maintenance operator). Here, note that answer statements corresponding to every causes of failure are assumed to be generated in advance and to be stored in the storage 10.

Figure 10:
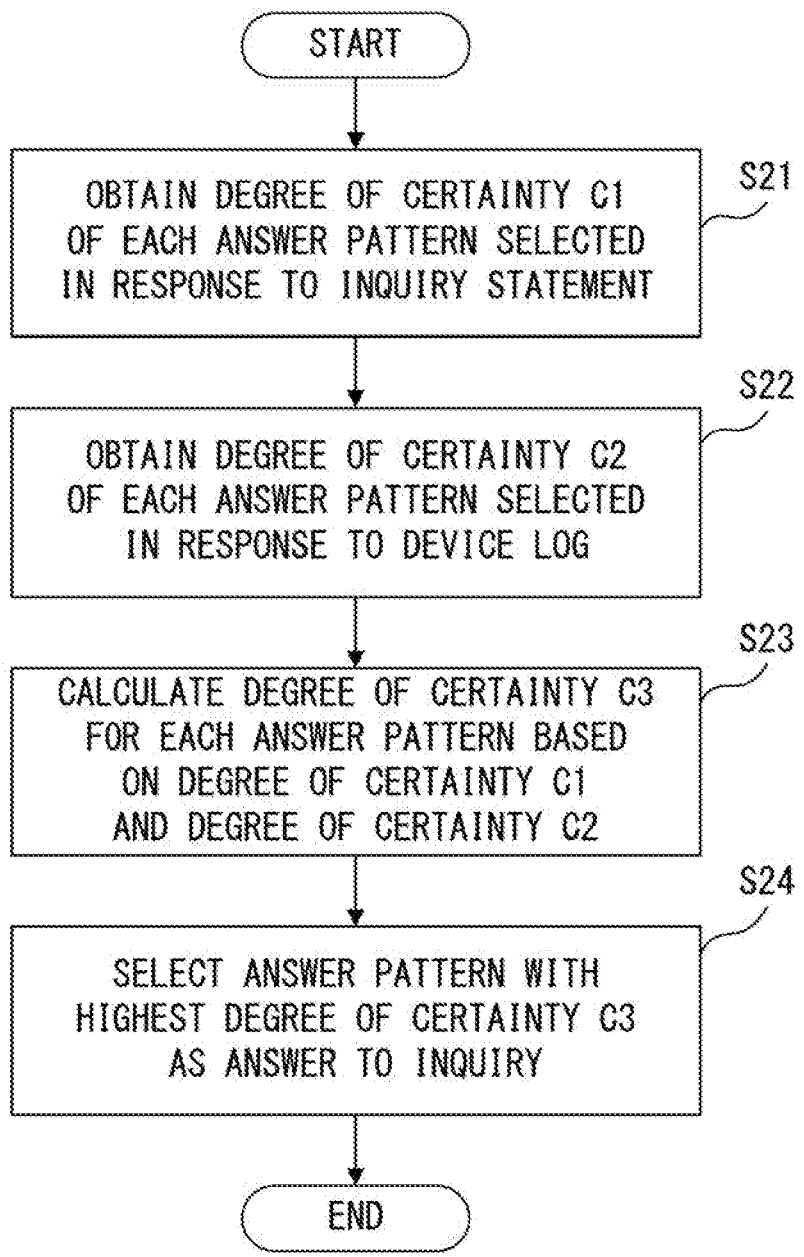
FIG. 10 is a flowchart of an example of a method of determining an answer based on both an inquiry statement and a device log.

FIG. 10 is a flowchart of an example of a method of determining an answer based on both an inquiry statement and a device log. Note that the process executed by the selector 14 as illustrated in FIG. 5 and the process executed by the extractor 15 and the selector 16 as illustrated in FIG. 8 have been finished before the process in this flowchart is executed.

In S21, the answer determination unit 17 obtains degrees of certainty C1 of answer patterns corresponding to the inquiry statement. In S22, the answer determination unit 17 obtains degrees of certainty C2 of answer patterns corresponding to the device log. In S23, the answer determination unit 17 calculates degrees of certainty C3 for each of the answer patterns based on the degrees of certainty C1 and the degrees of certainty C2. In this example, the answer determination unit 17 obtains a degree of certainty C3 by averaging a degree of certainty C1 and a degree of certainty C2 for each answer pattern. In S24, the answer determination unit 17 selects an answer pattern to be provided to the user based on the degrees of certainty C3. More specifically, an answer pattern with the highest degree of certainty C3 is selected as an "answer".

When an answer is determined by the answer determination unit 17, the network analyzer 1 accumulates a relation between the answer and a word vector in each of the storages 12 and 13. More specifically, the new word vector in FIG. 3A and the answer pattern selected by the answer determination unit 17 are associated with each other and are added to the storage 12. In addition, the new word vector in FIG. 6A and the answer pattern selected by the answer determination unit 17 are associated with each other and are added to the storage 13.

When an answer is determined by the answer determination unit 17, the network analyzer 1 updates classification models through machine learning. For example, each classification model is updated according to information that indicates a relation between a word vector and an answer that has been added to the storages 12 and 13. At that time, for example, weights of every nodes in the neural networks illustrated in FIG. 38 and FIG. 6B are updated.

Figure 11:
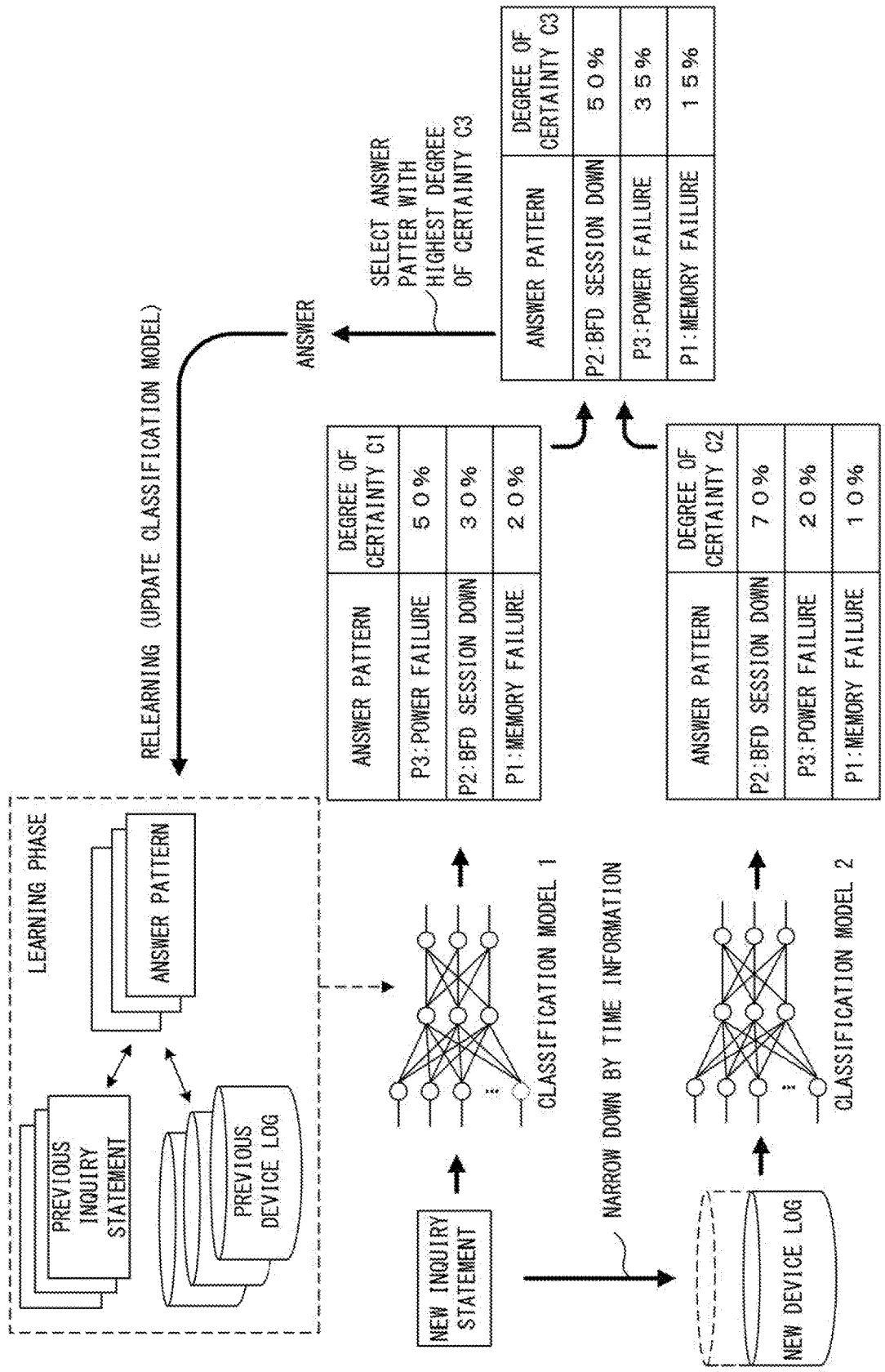
FIG. 11 schematically illustrates an example of processing in a network analyzer.

FIG. 11 schematically illustrates an example of processing in the network analyzer 1. In FIG. 11, a learning phase can be realized by accumulating relations between inquiries that the network analyzer 1 received previously and answers provided to users in response to the inquiries. At that time, classification models are generated and updated. Note that a classification model 1 is used to select one or plural answer patterns corresponding to an inquiry statement. A classification model 2 is used to select one or more plural answer patterns corresponding to a device log.

An inquiry received from a user includes an inquiry statement and a device log. When the inquiry statement is input to the classification model 1, one or plural answer patterns are selected as answer candidate(s). At that time, each answer pattern corresponding to the inquiry statement has a degree of certainty C1 assigned. Similarly, when the device log is input to the classification model 2, one or plural answer patterns are selected as answer candidate(s). At that time, each answer pattern corresponding to the device log has a degree of certainty C2 assigned. Note that an amount of information of the device log may be reduced according to time information that is included in the inquiry statement.

Afterwards, the network analyzer 1 calculates a degree of certainty C3 for each answer pattern based on the degrees of certainty C1 and the degrees of certainty C2. The network analyzer 1 outputs an answer pattern with the highest degree of certainty C3 as an answer to the inquiry. In other words, the network analyzer 1 determines an answer based on both an inquiry statement and a device log. As a result, even when an inquiry statement does not accurately describe the situation of network failure, a proper answer to the failure can be obtained.

As described above, the network analyzer 1 determines an answer pattern by using both an inquiry statement and a device log received from a user. Here, as an alternative method of determining an answer by using both an inquiry statement and a device log, a possible procedure is that after answer candidate(s) is/are determined according to an inquiry statement, a maintenance operator checks whether the answer candidate(s) is/are appropriate or not by referencing to the device log. The method by using the network analyzer 1 (hereinafter referred to as "proposed method") and the above alternative method are compared with each other in the following.

In the alternative method, a classification model is generated and updated based solely on inquiry statements, resulting in a smaller load of machine learning. On the other hand, in the proposed method, the load of machine learning is greater since both a classification model based on inquiry statements and a classification model based on device logs are generated and updated. However, the network analyzer 1 may reference to log information within a time range determined in accordance with contents of an inquiry statement, rather than referencing to the entirety of a device log received from a user. In this case, the load of machine learning in the proposed method can be reduced.

In the alternative method, a larger load is imposed on the maintenance operator since the maintenance operator references to a device log and checks whether the answer candidate(s) is/are appropriate or not. On the other hand, in the proposed method, an answer is determined by the network analyzer 1 by using both an inquiry statement and a device log, and the maintenance operator just needs to check the final answer statement. In other words, a load imposed on the maintenance operator is smaller in the proposed method.

In addition, the applicant of the present application looked at 1000 incidents to examine the reasonability of answers based solely on inquiry statements and that of answers based on both inquiry statements and device logs. As a result of this examination, the applicant confirmed that the reasonability of answers is significantly improved when both inquiry statements and device logs are taken into account.

Hardware Configuration

Figure 12:
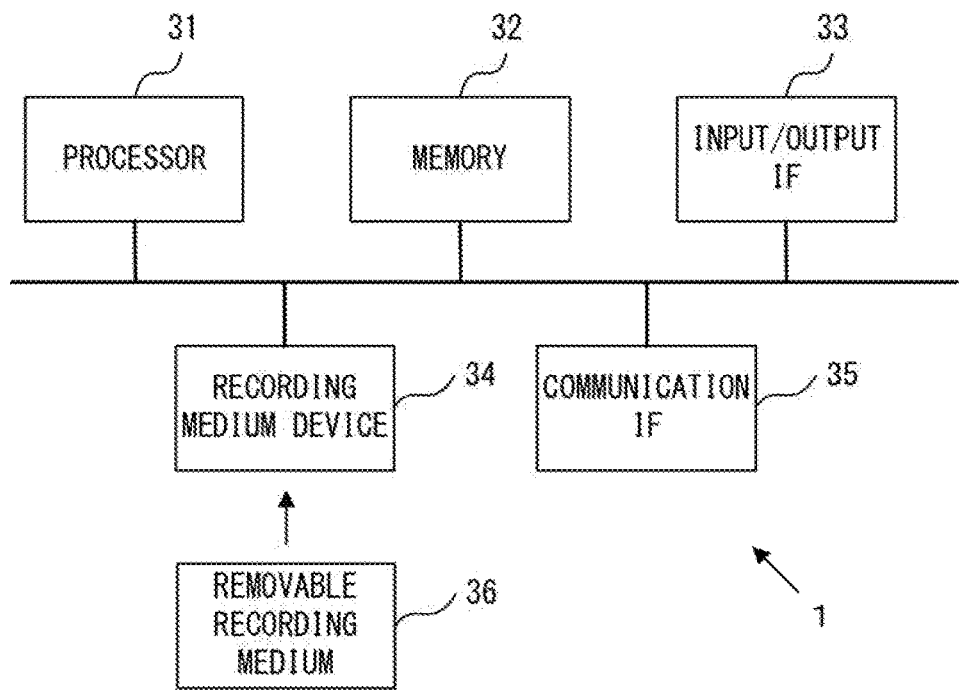
FIG. 12 illustrates an example of a hardware configuration of a network analyzer.

FIG. 12 illustrates an example of a hardware configuration of a network analyzer 1. The network analyzer 1 has a processor 31, a memory 32, an input/output IF 33, a recording medium device 34, and a communication IF 35. Note that the network analyzer 1 may have other components or functions that are not illustrated in FIG. 12.

The processor 31 provides functions of the network analyzer 1 (i.e., the selector 14, the extractor 15, the selector 16, and the answer determination unit 17) by executing network analysis programs stored in the memory 32. The processing of the flowchart in FIG. 5, that of the flowchart in FIG. 8, and that of the flowchart in FIG. 10, for example, are described in the network analysis programs. The selector 14, the extractor 15, the selector 16, and the answer determination unit 17 are implemented by the processor 31 executing the network analysis programs. Note that the storages 10, 12 and 13 in FIG. 2 may be implemented by the memory 32.

The input/output IF 33 receives instructions that are input via input devices such as a keyboard, a mouse, and a touch panel. The input/output IF 33 outputs a processing result of the processor 31. The recording medium device 34 can read out information or data recorded in a removable recording medium 36. The network analysis programs may therefore be given to the network analyzer 1 from a removable recording medium 36. The communication IF 35 provides an interface to connect to a network. The receiver 11 therefore corresponds to the communication IF 35. The network analysis programs may be given to the network analyzer 1 via the communication IF 35 from a program server connected to a network.

Variation 1

In the example illustrated in FIG. 9, the answer determination unit 17 obtains a degree of certainty C3 by averaging a degree of certainty C1 and a degree of certainty C2 for each of selected answer patterns. However, the present embodiments are not limited to this method. In other words, the answer determination unit 17 may obtain the degree of certainty C3 by means of other methods.

For example, the answer determination unit 17 calculates a correlation value between answer candidates corresponding to an inquiry statement and answer candidates corresponding to a device log. Here, when this correlation value is high, it is highly possible that accurate answer patterns to the inquiry statement were selected. On the other hand, when this correlation value is low, selected answer patterns to the inquiry statement is less likely to be accurate. The answer determination unit 17 then changes methods of calculating a degree of certainty C3 for each answer pattern in accordance with this correlation value.

In the example illustrated in FIG. 13, answer patterns P1 to P5 are selected for each of an inquiry statement and a device log. The answer determination unit 17 calculates correlation values between the answer patterns P1 to P5 selected for the inquiry statement and the answer patterns P1 to P5 selected for the device log.

In this example, the correlation values are calculated by using Spearman's rank correlation coefficient. More specifically, the answer determination unit 17 calculates a correlation value Rxy by means of formula (1). Note that n represents the number of selected answer patterns. Xi represents a rank of each of the answer patterns Pi (i=1 to 5) selected for an inquiry statement, and Yi represents a rank of each of the answer patterns Pi (i=1 to 5) selected for a device log.

$$Rxy = 1 - \frac{6}{n(n^2-1)} \sum_{i=1}^{n} (Xi - Yi)^2 \qquad (1)$$

In the example illustrated in FIG. 13, n is 5. The ranks Xi of the answer patterns P1, P2, P3, P4, and P5 selected for the inquiry statement are 4, 5, 3, 2, and 1, respectively. On the other hand, the ranks Yi of the answer patterns P1, P2, P3, P4, and P5 selected for the device log are 5, 4, 3, 2, and 1, respectively. When Xi and Yi are given to the formula (1), "0.9" can be obtained as a correlation value Rxy.

Here, the maximum value of the correlation value Rxy is 1. When the correlation value Rxy is larger than a specified threshold (e.g., 0.6), the answer determination unit 17 determines that the answer patterns selected for an inquiry statement are highly reliable. In this case, the answer determination unit 17 calculates a degree of certainty C3 for each answer pattern by using formula (2). That is, the degree of certainty C3 is calculated by a simple averaging.

$$C3_i = \frac{1}{2}(C1_i + C2_i) \qquad (2)$$

The answer determination unit 17 determines an answer to be provided to the user based on degrees of certainty C3 of the answer patterns. More specifically, an answer pattern with the highest degree of certainty C3 is selected as an answer to be provided to the user. In this example, the answer pattern P5 is selected.

In the example in FIG. 14, a correlation between answer candidates corresponding to an inquiry statement and answer candidates corresponding to a device log is low. More specifically, the correlation value Rxy is "−0.8, which is lower than the above threshold. In this case, the answer determination unit 17 determines that the answer patterns selected for the inquiry statement have low reliability. In this case, the answer determination unit 17 calculates a degree of certainty C3 for each answer pattern by using formula (3).

$$C3_i = \frac{1}{5}(C1_i + 4 \times C2_i) \qquad (3)$$

When the correlation value Rxy is equal to or less than the threshold, it is probable that the network failure is not described accurately in an inquiry statement and answer candidates for the inquiry statement are considered to have 1cw reliability. In such a case, a contribution ratio of an analysis result based on the device log is set to be higher than that of an analysis result based on the inquiry statement. Note that the contribution ratio can be realized by weights for calculating a weighted average between an answer pattern corresponding to the inquiry statement and an answer pattern corresponding to the device log. In formula (3), the contribution ratio of the analysis result based on the device log is four times higher than that of the analysis result based on the inquiry statement.

The answer determination unit 1 determines an answer to be provided to the user based on degrees of certainty C3 of answer patterns. More specifically, an answer pattern with the highest degree of certainty C3 is selected as an answer to be provided to the user. In this example, the answer pattern P5 is selected. In this manner, when a correlation between answer candidates corresponding to an inquiry statement and answer candidates corresponding to a device log is low, an answer that is different from an analysis result based on the inquiry statement may be generated.

Figure 15:
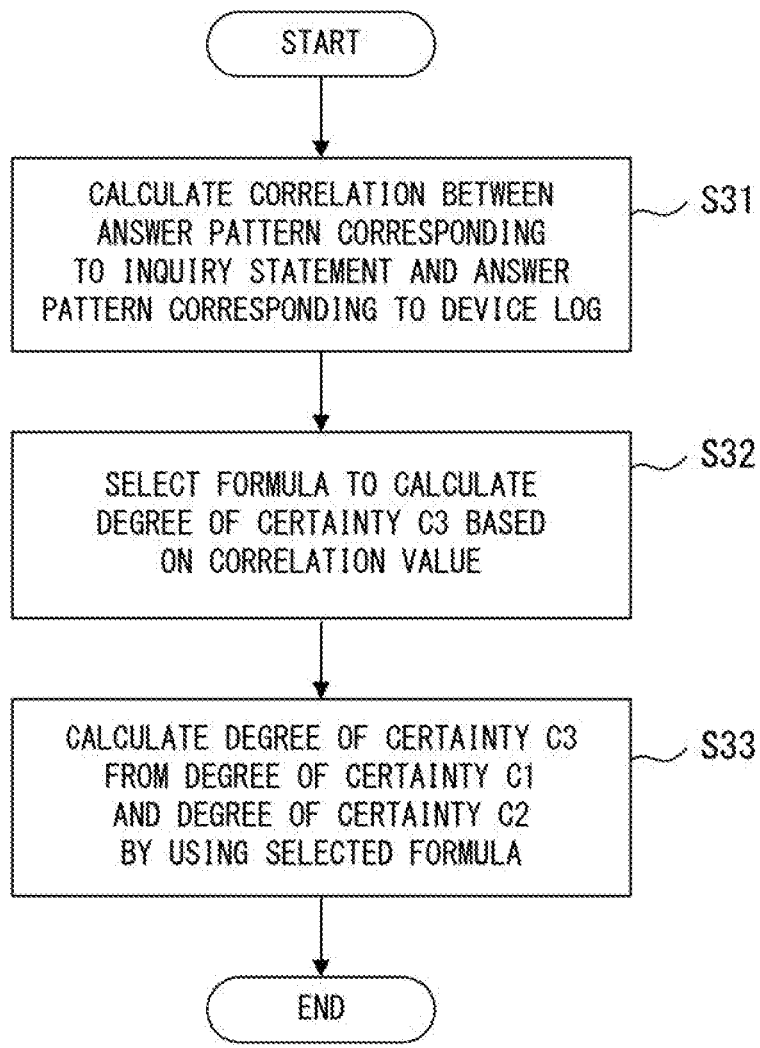
FIG. 15 is a flowchart of an example of a method of calculating a degree of certainty in accordance with a correlation value.

FIG. 15 is a flowchart of processing in Variation 1. Note that the flowchart in FIG. 15 corresponds to one of examples of S23 in the flowchart in FIG. 10.

In S31, the answer determination unit 17 calculates a correlation between answer candidates corresponding to an inquiry statement and answer candidates corresponding to a device log. In other words, a correlation between one or plural answer patterns corresponding to the inquiry statement and one or plural answer patterns corresponding to the device log is calculated. A correlation value is calculated by using Spearman's rank correlation coefficient as an example. The correlation value may be calculated by other methods. In S32, the answer determination unit 17 selects a formula for calculating degrees of certainty C3 for the answer patterns based on the correlation value calculated in S31. In the examples illustrated in FIG. 13 and FIG. 14, when a correlation value Rxy is larger than a threshold, formula (2) is selected and formula (3) is selected when the correlation value Rxy is equal to or less than the threshold. In S33, the answer determination unit 17 calculates a degree of certainty C3 from a degree of certainty C1 and a degree of certainty C2 for each of the answer patterns by using the selected formula.

S24 in the flowchart in FIG. 10 is executed afterward. More specifically, an answer pattern with the highest degree of certainty C3 is selected as an answer to be provided to the user.

Variation 2

When an answer in response to an inquiry from a user is determined, the network analyzer 1 stores a relation between the inquiry and the answer in the storages 12 and 13. For example, a relation between a word vector of an inquiry statement and an answer pattern determined in response to an inquiry is stored in the storage 12. A relation between a word vector of a device log and an answer pattern determined in response to an inquiry is stored in the storage 13. Based on the information accumulated in the storages 12 and 13, classification models are updated through machine learning. Here, the updated classification models are used to select answer candidates for the next inquiry. It is therefore not preferable to use a relation between an inquiry and an answer in the machine learning to generate classification models when reliability of the answer is low.

Therefore, the network analyzer 1 determines reliability of an answer based on an inquiry statement to be low when a correlation between answer candidates corresponding to the inquiry statement and answer candidates corresponding to a device log is low. As an example, when a correlation value Rxy used in Variation 1 is smaller than a specified threshold, the reliability of an answer based on an inquiry statement is determined to be low. When the correlation value Rxy is smaller than the threshold, the network analyzer 1 does not store the relation between a word vector of the inquiry statement and an answer pattern determined for the inquiry in the storage 12. In other words, relations with low reliability are not used in generating classification models. In this manner, an answer pattern with low reliability is not likely to be selected in response to an inquiry from a user. Note that even when a correlation value Rxy is smaller than a threshold, the network analyzer 1 may store a relation between a word vector of the device log and an answer pattern determined for the inquiry in the storage 13.

Variation 3

In many cases, information in a device log sent from a user at the time of inquiry is large in volume, as described above. For that reason, the selector 16 (or the extractor 15) reduces the volume of information by performing preprocessing of the device log. For example, in the example in FIG. 7, the selector 16 deletes numerical information including log ID, and date and time from a device log as the preprocessing. On the other hand, in order to identify a site where a failure occurred in a network device, information that is related to an interface number of a network device is considered to be important. Thus, the selector 16 therefore extracts a description that co-occurs with the interface number of the network device from the device log. Note that in the example in FIG. 7, an interface number consists of slot number/card number/port number. For example, the following description represents such a state that heartbeat signals are not detected in slot number 1/card number 2/port number 3.

BFD Session on Interface 1/2/3 is down due to no heartbeat

In Variation 3, as described above, a description that co-occurs with an interface number of a network device is extracted from a device log and an answer to an inquiry is generated according to the extracted description. Afterward, a relation between the inquiry and the answer is accumulated in the storage 13 and is used for updating a classification model. Accordingly, the network analyzer 1 can detect a tendency of failures that occur in a particular interface.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A network analyzer that provides an answer to an inquiry including an inquiry statement about a network failure and a device log corresponding to the inquiry statement, the network analyzer comprising:
a storage configured to store first information that indicates a relation between a previously received inquiry statement and an answer pattern that has been provided in response to an inquiry including the previously received inquiry statement and second information that indicates a relation between a previously received device log and an answer pattern that has been provided in response to an inquiry including the previously received device log; and
a processor configured to
calculate, for a new inquiry statement, first certainty information indicating a certainty of each of a plurality of answer patterns that have been provided in response to previously received inquiries, based on the first information,
select first answer patterns from the plurality of answer patterns according to the first certainty information,
calculate, for a new device log corresponding to the new inquiry statement, second certainty information indicating a certainty of each of the plurality of answer patterns, based on the second information,
select second answer patterns from the plurality of answer patterns according to the second certainty information,
calculate a correlation value indicating a correlation between the first answer patterns and the second answer patterns,
determine a first contribution value indicating a contribution of the first certainty information and a second contribution value indicating a contribution of the second certainty information such that as the correlation value becomes smaller, the second contribution value becomes higher compared with the first contribution value, and
determine an answer to the new inquiry statement based on the first answer patterns, the first contribution value, the second answer patterns, and the second contribution value.

2. The network analyzer according to claim 1, wherein the processor extracts, from the new device log, log information within a time range that corresponds to information related to a point in time written in the new inquiry statement, and
the processor calculates, for the extracted log information, the second certainty information and selects the second answer patterns.

3. The network analyzer according to claim 1, wherein when the correlation value is larger than a specified threshold, a relation between the new inquiry and an answer determined by the processor is added to the first information.

4. The network analyzer according to claim 1, wherein the processor extracts an interface number of a network device in a process of extracting a plurality of words from the new device log and
determines the second answer patterns based on the second information and the words including the interface number extracted from the new device log.

5. The network analyzer according to claim 1, wherein the processor calculates the correlation value by using Spearman's rank correlation coefficient.

6. The network analyzer according to claim 1, wherein when the correlation value is larger than a correlation threshold, the first contribution value is same as the second contribution value, when the correlation value is smaller than the correlation threshold, the second contribution value is higher than the first contribution value.

7. A network analyzing method that provides an answer to an inquiry including an inquiry statement about a network failure and a device log corresponding to the inquiry statement, the method comprising:
- calculating, for a new inquiry statement, first certainty information indicating a certainty of each of a plurality of answer patterns that have been provided in response to previously received inquiries, based on the first information that indicates a relation between a previously received inquiry statement and an answer pattern that has been provided in response to an inquiry including the previously received inquiry statement;
- selecting first answer patterns from the plurality of answer patterns according to the first certainty information;
- calculating, for a new device log corresponding to the new inquiry statement, second certainty information indicating a certainty of each of the plurality of answer patterns, based on the second information that indicates a relation between a previously received device log and an answer pattern that has been provided in response to an inquiry including the previously received device log;
- selecting second answer patterns from the plurality of answer patterns according to the second certainty information;
- calculating a correlation value indicating a correlation between the first answer patterns and the second answer patterns;
- determining a first contribution value indicating a contribution of the first certainty information and a second contribution value indicating a contribution of the second certainty information such that as the correlation value becomes smaller, the second contribution value becomes higher compared with the first contribution value; and
- determining an answer to the new inquiry statement based on the first answer patterns, the first contribution value, the second answer patterns, and the second contribution value.

8. A non-transitory computer-readable recording medium having stored therein a network analyzing program that causes a processor to execute a process, the process comprising:
- calculating, for a new inquiry statement, first certainty information indicating a certainty of each of a plurality of answer patterns that have been provided in response to previously received inquiries, based on the first information that indicates a relation between a previously received inquiry statement and an answer pattern that has been provided in response to an inquiry including the previously received inquiry statement;
- selecting first answer patterns from the plurality of answer patterns according to the first certainty information;
- calculating, for a new device log corresponding to the new inquiry statement, second certainty information indicating a certainty of each of the plurality of answer patterns, based on the second information that indicates a relation between a previously received device log and an answer pattern that has been provided in response to an inquiry including the previously received device log;
- selecting second answer patterns from the plurality of answer patterns according to the second certainty information;
- calculating a correlation value indicating a correlation between the first answer patterns and the second answer patterns;
- determining a first contribution value indicating a contribution of the first certainty information and a second contribution value indicating a contribution of the second certainty information such that as the correlation value becomes smaller, the second contribution value becomes higher compared with the first contribution value; and
- determining an answer to the new inquiry statement based on the first answer patterns, the first contribution value, the second answer patterns, and the second contribution value.

\* \* \* \* \*